W. H. Tambling,

Washing Machine,

No. 886

Reissued Jan. 17, 1860.

Witnesses:

C. M. Alexander

A. W. Trawsoni

Inventor:

William H. Tambling

N. PETERS. PHOTO-LITHOGRAPHER, WASHINGTON, D. C.

UNITED STATES PATENT OFFICE.

WILLIAM H. TAMBLING, OF BERLIN, WISCONSIN.

IMPROVED WASHING-MACHINE.

Specification forming part of Letters Patent No. 25,774, dated October 11, 1859; Reissue No. 886, dated January 17, 1860.

*To all whom it may concern:*

Be it known that I, WM. H. TAMBLING, of Berlin, in the county of Green Lake and State of Wisconsin, have invented certain new and useful Improvements in Washing-Machines; and I do hereby declare that the following is a full, clear, and exact description of the same, reference being had to the accompanying drawings and the letters of reference marked thereon.

The nature of my invention consists in constructing and arranging the inside of a revolving wash-box in the manner hereinafter set forth, or in any other way substantially the same.

Figure 2:
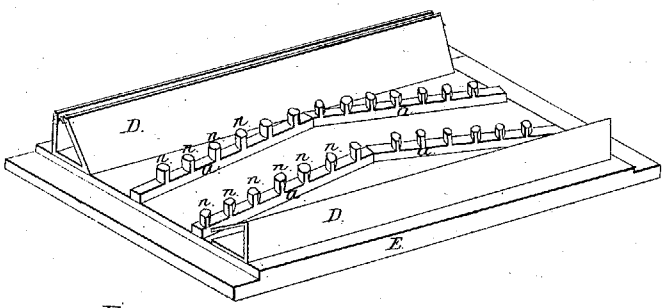
Figure 3:
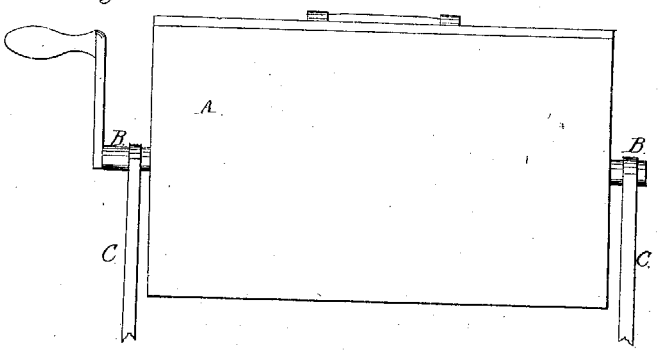
Figure 1:
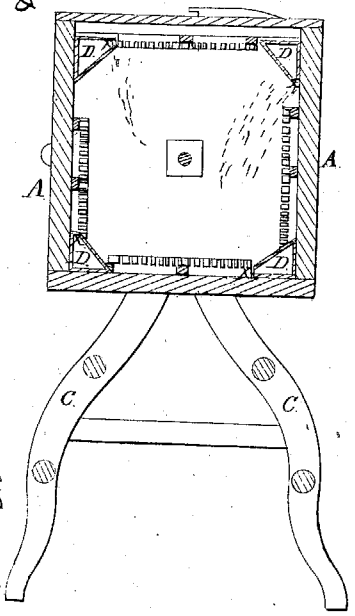

In the drawings, Figure 1 represents a vertical cross-section. Fig. 2 is a perspective of one side of the box removed. Fig. 3 is a side view of the box in its bearings.

In the figures, A represents a box, which is made of any suitable size, either of a square or oblong form. To the two ends of this box are secured two short journals, which rest in journal-bearings in a frame, *c c*. The box revolves upon these journals when the operation of washing is in progress. The interior of the box A is provided with four buckets, (marked D D D D,) which are situated in the four corners of the box. These buckets are in a triangular form, and are closed at their ends. They are open at one angle, as is represented at *x x*. The object of these buckets is to raise and pour the water in the box upon the clothes as the said box revolves upon its journals. It will be seen that when the buckets are down the water from the box enters them, they carry it up, and as they approach the top the water begins to pour out upon the clothes. Thus there is almost a continual stream of water pouring upon the clothes all the while. E represents one of the sides of the box. Both the sides and the ends of box are constructed in a manner similar to the side E. This side, it will be seen, is provided with bars *a a*. These bars are in two parts, as seen, and when their ends are placed together they stand at an angle of about a hundred and fifty degrees to each other. These bars *a a* are provided with a series of short pins, *n n n*, as is represented in Fig. 2, the bars being for the purpose of giving direction to the water, while the pins serve to keep the clothes off from the bars and the sides of the box, so that there may be a free circulation of water around and through the inside of the box. This box is made very close, with a close-fitting door, so that when filled with or partially filled with water and with clothes the water will not leak out. Where clothes are placed in the box they are washed by the continual pouring of the water upon them, and by the friction caused by the clothes coming in contact with the pins and with each other, as the box revolves upon its journals.

I do not wish to confine myself to any particular form of bucket or the buckets being placed in any particular locality, as in either of these two respects slight alterations may be made without in any degree affecting the operation of the machine.

Having thus fully described my invention, what I claim as new, and desire to secure by Letters Patent, is—

1. The employment of the bars *a a*, provided with pins *n n*, when used in connection with a box or cylinder provided with buckets, substantially as and for the purpose herein specified.

2. I do not wish to confine myself to this or any other form of buckets, but claim the whole principle of dipping and pouring water in whatever form the buckets may be made, or in whatever way they may be attached to the machine.

WILLIAM H. TAMBLING.

Attest:
O. F. SILVER,
W. B. VIBBERT.